United States Patent
Falstrup et al.

(10) Patent No.: US 10,225,655 B1
(45) Date of Patent: Mar. 5, 2019

(54) STEREO USER INTERFACE ELEMENTS PLACED IN 3D SPACE FOR VIRTUAL REALITY APPLICATIONS IN HEAD MOUNTED DISPLAYS

(71) Applicant: Relay Cars LLC, Rancho Dominguez, CA (US)

(72) Inventors: David Falstrup, Rancho Dominguez, CA (US); Thom Denick, Rancho Dominguez, CA (US); Alex McClain, Los Angeles, CA (US); Seth Peterson, Rancho Dominguez, CA (US); Pat Hadnagy, Los Angeles, CA (US)

(73) Assignee: Relay Cars LLC, Rancho Dominguez, CA (US)

( * ) Notice: Subject to any disclaimer, the term of this patent is extended or adjusted under 35 U.S.C. 154(b) by 0 days.

(21) Appl. No.: 15/659,925

(22) Filed: Jul. 26, 2017

Related U.S. Application Data (60) Provisional application No. 62/368,836, filed on Jul. 29, 2016.

(51) Int. Cl.
| | |
|---|---|
| *H04R 5/02* | (2006.01) |
| *G06F 3/01* | (2006.01) |
| *G02B 27/01* | (2006.01) |
| *H04N 13/327* | (2018.01) |
| *H04R 5/00* | (2006.01) |

(52) U.S. Cl.
CPC ........... *H04R 5/02* (2013.01); *G02B 27/0172* (2013.01); *G06F 3/011* (2013.01); *H04N 13/327* (2018.05); *H04R 5/00* (2013.01); *H04S 2400/11* (2013.01)

(58) Field of Classification Search
CPC ...... G06F 3/011; G06F 1/1694; G06F 3/0485; G06F 3/04815; G06F 3/0488; G06F 2200/1637; G06T 19/006; A63F 13/25; A63F 13/52
See application file for complete search history.

(56) References Cited

U.S. PATENT DOCUMENTS

| | | | |
|---|---|---|---|
| 7,337,410 B2 | 2/2008 | Lin | |
| 7,439,975 B2 * | 10/2008 | Hsu | G06T 15/60 345/426 |
| 8,046,719 B2 | 10/2011 | Skourup et al. | |
| 8,502,817 B2 * | 8/2013 | Deb | G06T 19/003 345/419 |
| 8,913,056 B2 * | 12/2014 | Zimmer | G06T 15/20 345/419 |
| 9,530,243 B1 * | 12/2016 | Costello | G06T 15/503 |

(Continued)

FOREIGN PATENT DOCUMENTS

| | | |
|---|---|---|
| GB | 2377147 | 12/2002 |

*Primary Examiner* — Neil R Mikeska
(74) *Attorney, Agent, or Firm* — Socal IP Law Group LLP; Mark A. Goldstein (57) ABSTRACT

A method to create a seamlessly immersive experience by having stereo components placed in 3D space, keeping realism and engagement as high as possible, to simulate virtual reality applications in a head mounted display. The method involves a placement of stereo user interface elements in 3D space for use in a virtual reality applications using a proprietary layered panoramas method. The invention utilizes a placement into 3D space, flat 2D stereoscopic user interface elements so that they fit in an immersive experience and appear to match in a z depth plane for the experience.

3 Claims, 7 Drawing Sheets

(56) References Cited

U.S. PATENT DOCUMENTS

| | | | |
|---|---|---|---|
| 9,643,314 B2 | 5/2017 | Guerin et al. | |
| 9,646,588 B1 | 5/2017 | Bencar et al. | |
| 9,778,815 B2 * | 10/2017 | Motta | G06F 3/012 |
| 2004/0104941 A1 | 6/2004 | Natoli | |
| 2009/0251460 A1 * | 10/2009 | Dunnigan | G06T 15/50 |
| | | | 345/419 |
| 2012/0038645 A1 * | 2/2012 | Norrby | G06T 15/60 |
| | | | 345/426 |
| 2012/0133677 A1 * | 5/2012 | Suzuki | G06F 1/1694 |
| | | | 345/649 |
| 2013/0194269 A1 * | 8/2013 | Matas | G06T 11/60 |
| | | | 345/426 |
| 2015/0091903 A1 * | 4/2015 | Costello | G06T 15/20 |
| | | | 345/426 |
| 2016/0180574 A1 | 6/2016 | Kaminitz et al. | |
| 2017/0139474 A1 | 5/2017 | Rochford et al. | |

\* cited by examiner

STEREO USER INTERFACE ELEMENTS PLACED IN 3D SPACE FOR VIRTUAL REALITY APPLICATIONS IN HEAD MOUNTED DISPLAYS

CROSS-REFERENCE TO RELATED APPLICATION

This patent application claims priority to Provisional Application No. 62/368,836 filed on Jul. 29, 2016.

BACKGROUND OF THE INVENTION

1. Field of the Invention

The present invention relates to the field of stereo user interface (UI) elements placed in 3D space for virtual reality applications for display using a head mounted display (HMD).

2. Description of the Prior Art

The following 8 patents and published patent applications are the closest prior art known to the inventors.
1. United States Published Patent Application No. 2004/0104941 to Anthony James Francis Natoli on Jun. 3, 2004 for "Virtual Reality Keyboard System and Method" (hereafter the "Natoli Published Patent Application");
2. U.S. Pat. No. 7,337,410 issued to Julius Lin on Feb. 26, 2008 for "Virtual Workstation" (hereafter the "Lin Patent");
3. U.S. Pat. No. 8,046,719 issued to Charlotte Skourup et al. on Oct. 25, 2011 for "Virtual Work Place" (hereafter the "Skourup Patent");
4. United States Published Patent Application No. 2016/0180574 to Kobi Kaminitz et al. on Jun. 23, 2016 for "System, Device and Method for Providing User Interface for a Virtual Reality Environment" (hereafter the "Kaminitz Published Patent Application");
5. U.S. Pat. No. 9,646,588 issued to Gary Bencar et al. on May 9, 2017 for "Cyber Reality Musical Instrument and Device" (hereafter the "Bencar Patent");
6. U.S. Pat. No. 9,643,314 issued to Kelleher Guerin et al. on May 9, 2017 for "Robot Control, Training and Collaboration in an Immersive Virtual Reality Environment" (hereafter the "Guerin Patent");
7. United States Published Patent Application No. 2017/0139474 to Ciaran Rochford et al. on May 18, 2017 for "Body Position Sensitive Virtual Reality" (hereafter the "Rochford Published Patent Application");
8. UK Patent Application No. GB2377147 to Kari J. Kangas et al. on Dec. 31, 2002 for "A Virtual Reality User Interface" (hereafter the "Kangas UK Patent Application").

The abandoned Natoli Published Application disclosed a method for providing a virtual reality keyboard through which the virtual reality applications are processed.

The expired Lin Patent disclosed utilizing a virtual keyboard and virtual pointing device used in conjunction with a display device.

The Skourup Patent discloses a method for controlling operating equipment for installations such as oil and gas.

The still pending Kaminitz Published Patent Application discloses a virtual reality headset connected to a portable computing device to generate a depth map of an object.

The Bencar Patent discloses virtual triggers for a cyber reality musical instrument.

The Guerin Patent discloses a virtual reality system for controlling a robot.

The Rochford Published Patent Application discloses a method for displaying a user interface through a head mounted display.

The 2001 UK Patent Application discloses an out-of-date system for viewing through a head mounted display.

SUMMARY OF THE INVENTION

The present invention is a novel, useful and non-obvious method for the placement of stereo user interface elements in 3D space for use in virtual reality applications using the Applicant's layered panorama method as disclosed and claimed in co-pending patent application Ser. No. 15/223,638 for LAYERED PANORAMAS FOR VIRTUAL REALITY assigned to the same assignee as the present invention. This novel approach utilizes the careful placement into 3D space, flat 2D stereoscopic user interface (UI) elements so that they fit in an immersive experience and appear to match in a z depth plane for the experience.

Defined in detail, the present invention is a method comprising:
 a. placing user interface icons with predefined transparency channels over an intended stereo background image;
 b. creating an icon for a left eye arranged over a left eye background image.
 c. offsetting user interface icons and translating the interface icons in an X and Y ground plane and placing said interface icons over a right eye background image, the offset determined by how close to a camera the interface icons appear in a z depth plane;
 d. performing operations in steps "a", "b" and "c" for every visible icon in a virtual reality experience;
 e. importing said interface icons with predefined transparency channels and placing each of said interface icons with its respective transparency channel onto a card, allowing the placement of the cards in X, Y, Z space;
 f. placing a mono camera in a scene at a relative position to how each selected background image was created;
 g. incorporating a directional light placed above each of the icon cards and enabling a received shadow and cast shadow for each of the icon cards and lights in each scene, causing the directional light to cast shadows from the icon cards to fall onto x, y and z planes;
 h. combining each image in each icon card to create an icon image in an appropriate z depth plane before shadows are cast on each of the icon images and combining two sets of images in output left eye and right eye for a final virtual reality application; and
 i. placing said left eye images and right eye images into a head mounted display for virtual reality applications.

Further defined in detail, the present invention is a method comprising:
 a. placing user interface icons with predefined transparency channels over at least one intended stereo background image;
 b. using compositing software, creating user interface icons for a left eye and arranging the left eye user interface icons over at least one left eye stereo background image;
 c. offsetting said user interface icons for the left eye and translating the user interface icons for the left eye in an X and Y ground plane and placing the user interface icons for the left eye over at least one corresponding right eye background image, determining an offset amount for the left eye icons in the corresponding right eye background for the user icons to appear in a z depth plane;

d. performing operations in steps "a". "b" and "c" for every user icon on a screen at any given time in a virtual reality experience;

e. after all user icons are arranged for both left and right eyes, switching said compositing software to 2.5D mode for use with the 3D viewport and importing and placing user icons on cards in 3D space;

f. setting up a ground plane by applying a Constant node with an RGB value of 0,0,0 (black) with an alpha channel of 1 to a card so that only shadows on the ground plane are visible;

g. placing each card at 0,0,0 XYZ to respectively translate X and Y ground plane and z depth plane with a setting of −90 on to receive cast shadows from the user icons;

h. placing a directional light above each icon cards so that 'Receive Shadow and Cast Shadow' must be enabled on all icon cards and lights in each scene thereby causing cast shadows from the icon cards to fall onto the ground plane;

i. just before the cast shadows are combined with the icon images, the cast shadows require a similar offset procedure to put them into a correct z depth plane by using a stereo displace tool with a selected value which by way of example is 50; and j. after the icon and cast shadow processes are complete, the two sets of images are combined and output using the Unity Game Engine for final placement within a software application.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Features:

This method allows the virtual reality application to create a seamlessly immersive experience by having stereo user interface (UI) elements placed correctly in 3D space, preserving the realism and engagement.

Processes:

The application provides for this effect through the following key processes. In this example, a node-based digital compositing application is used, but the present invention process applies to any similar compositing program.

Figure 1:
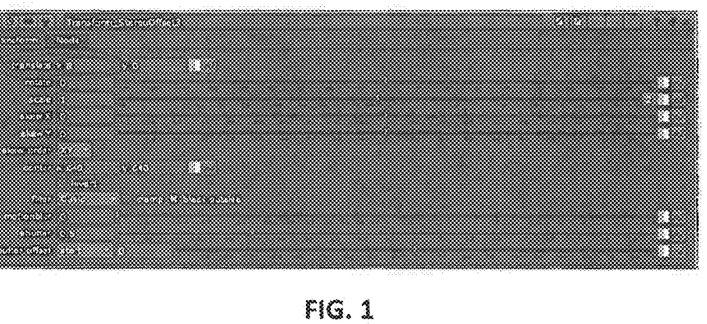
FIG. 1 is an illustration of the left eye background image and the right eye background image offset by an amount to determine how close to camera the UI icons appear in z depth plane.

1. Icons: This process starts with placing the user interface (UI) icons with transparency channels, over the intended stereo background images, left eye first for this example. Once they are arranged appropriately over the left eye background image, the icons are then offset and translated over in X and Y ground plane and placed over the right eye background image. This offset amount determines how close to camera the UI icons appear in z depth plane (FIG. 1). This is done for every icon on screen at any given time while in the virtual reality experience.

2. Shadows: Once the icons are arranged for both left and right eyes, the compositing software is switched to 2.5D mode for use with the 3D viewport. The icons with predefined transparency channels are imported and placed on cards. This allows the placement of the cards in 3D space, similar to where the icons will live in an app.

A camera (mono) is then placed in the scene at a relative position to how the background image was shot.

Figure 2:
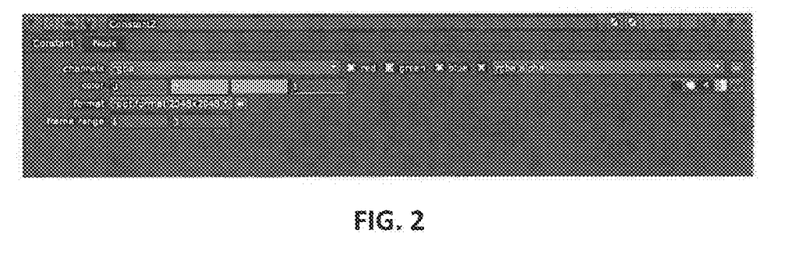
FIG. 2 is an illustration of adding a ground plane by applying a constant node with an RGB value of 0,0.0 (black) with an alpha channel of 1 to a card after a camera (mono) is placed in the scene at a relative position to how the background image was shot.
Figure 3:
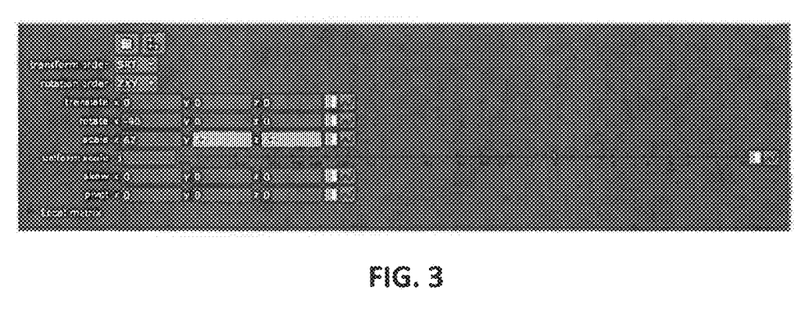
FIG. 3 is an illustration of the card placed at 0,0,0 XYZ to respectively translate X and Y ground plane and z depth plane with a setting of −90 on the X and Y ground plane and rotating and scaling up for adequate ground coverage, this ground plane is what will receive the cast shadows from the icons.

Next a ground plane is added. This is done by applying a Constant node with an RGB value of 0,0,0 (black) with an alpha channel of 1 to a card (FIG. 2). The color black is chosen because it prevents enables the ground plane in the final image from being visible. Though this process, only the shadows on the ground plane are visible. Next, the card is placed at 0,0,0 XYZ to respectively translate X and Y ground plane and z depth plane with a setting of −90 on the X and Y ground plane, rotating and scaling up as needed for adequate ground coverage (FIG. 3). This ground plane is what will receive the cast shadows from the icons.

Figure 4:
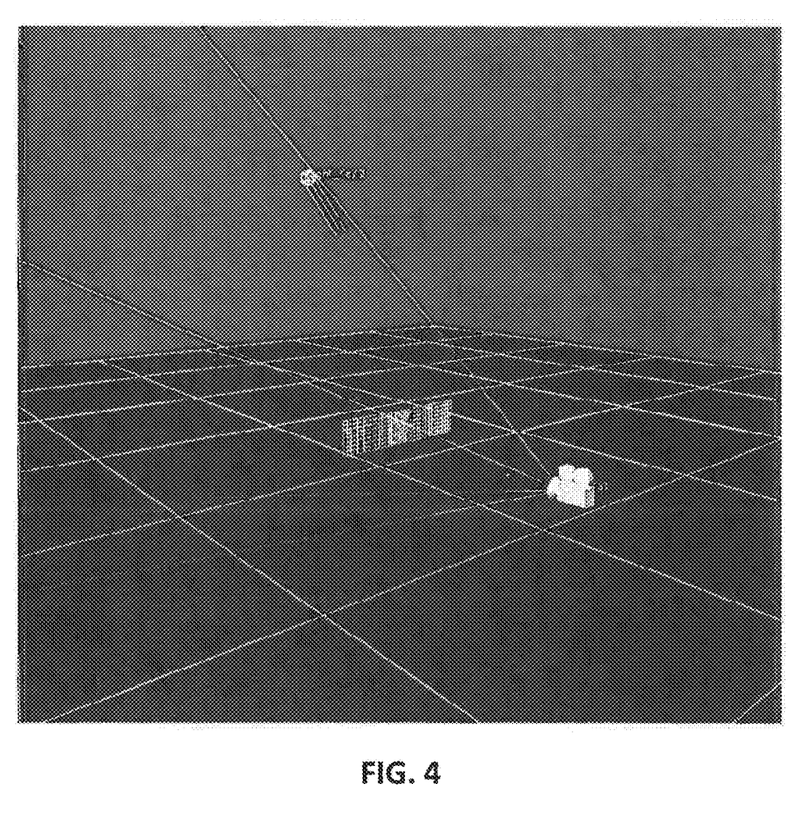
FIG. 4 is an illustration of the directional light causing cast shadows from the icon cards to fall onto the x y and z ground planes for 3D of viewport of final scenes.

Finally, a directional light is placed above the icon cards. 'Receive Shadow and Cast Shadow' must be enabled on all cards and lights in the scene. Now the directional light will cause cast shadows from the icon cards to fall onto the ground plane. See FIG. 4 for 3D viewport of final scene.

Figure 5:
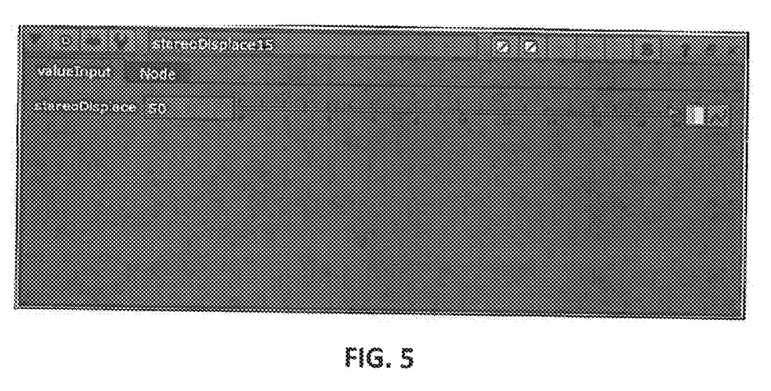
FIG. 5 is an illustration of right before the cast shadows are combined with the icon images, they require a similar offset procedure to put them into the correct z depth plane, this is done using a node-based digital compositing stereo displace tool.

Right before the cast shadows are combined with the icon images, they require a similar offset procedure to put them into the correct z depth plane. This is done using a stereo displace tool. For this example, using a node-based digital compositing application, a value of 50 is required (FIG. 5).

Figure 6A:
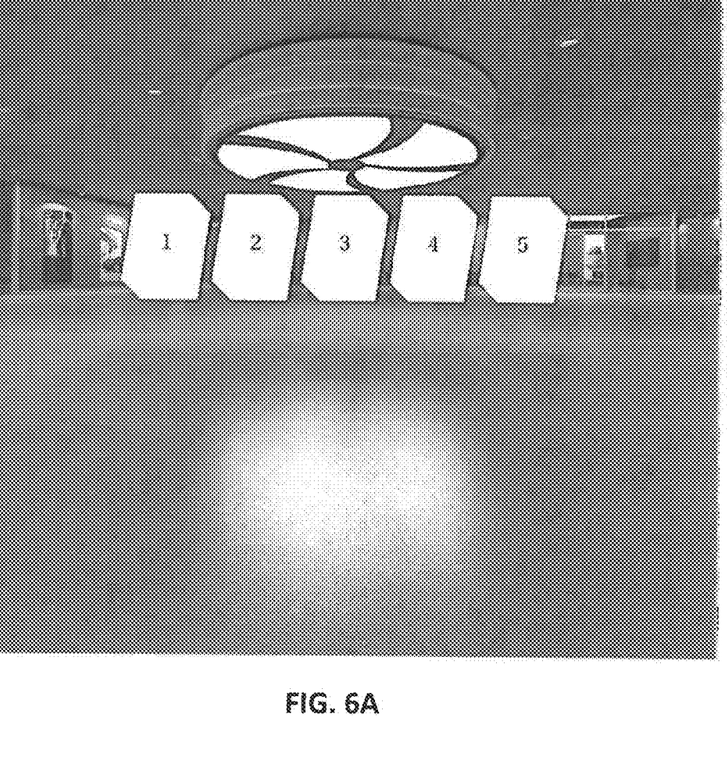
FIG. 6A is an illustration of a left eye app created after the icon and cast shadow processes created are complete, the two sets of images are combined and output to the Unity developer or final placement within the app for the left eye as illustrated.
Figure 6B:
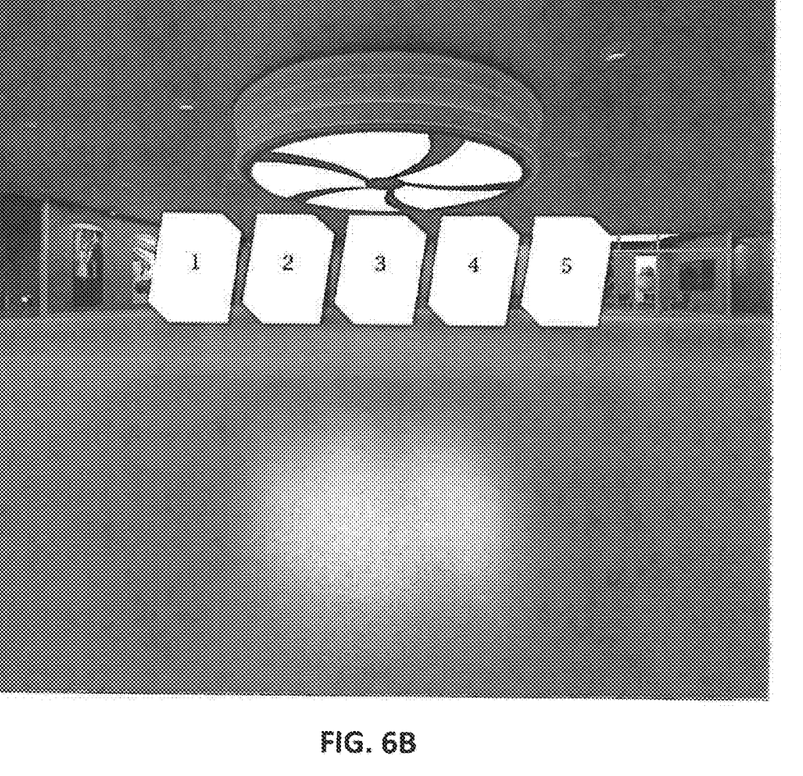
FIG. 6B is an illustration of a right eye application created after the icon and cast shadow creation processes are complete. The two sets of images are combined and output to the Unity Game Engine for final placement within the app for the right eye as illustrated.

Once the icon and cast shadow processes are complete, the two sets of images are combined and output using the Unity Game Engine for final placement within the app for the right eye as illustrated. Final images, left and right, are illustrated in FIGS. 6A and 6B.

Benefits:

This unique method expands the stereo, spatial experience the user sees when viewing a virtual reality application to include the UI elements, as opposed to having them float in front of the experience and therefore taking the viewer out of said experience.

This method is not obvious as it requires the creation of separate, stereo UI elements, which is not common at all in virtual reality production, and placing them in 3D space, which is also not common to typical virtual reality experience creation. An additional benefit is that icons processed with this method can be placed anywhere in 3D space in the game engine, but will appear at the proper stereo depth to the user in the VR application.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method comprising:
   a. placing user interface icons with predefined transparency channels over an intended stereo background image;
   b. creating an icon for a left eye arranged over a left eye background image;
   c. offsetting user interface icons and translating the interface icons in an X and Y ground plane and placing said interface icons over a right eye background image, an offset determined by how close to a camera the interface icons appear in a z depth plane;
   d. performing operations in steps "a", "b" and "c" for every visible icon in a virtual reality experience;
   e. importing said interface icons with predefined transparency channels and placing each of said interface icons on cards with its respective transparency channel onto a card, allowing the placement of the cards in X, Y, Z space;
   f. placing a mono camera in a scene at a relative position to how each selected background image was created;
   g. incorporating a directional light placed above each of the icon cards and enabling a received shadow and cast shadow for each of the icon cards and lights in each scene, causing the directional light to cast shadows from the icon cards to fall onto an X and Y ground plane;
   h. combining each image in each icon card to create an icon image in an appropriate z depth plane before shadows are cast on each of the icon images and combining two sets of images in output left eye and right eye for a final virtual reality application; and
   i. placing said left eye images and right eye images into a head mounted display for virtual reality applications.

2. A method comprising:
   a. placing user interface icons with predefined transparency channels over at least one intended stereo background image;
   b. using compositing software, creating user interface icons for a left eye and arranging the left eye user interface icons over at least one left eye stereo background image;
   c. offsetting said user interface icons for the left eye and translating the user interface icons for the left eye in an X and Y ground plane and placing the user interface icons for the left eye over at least one corresponding right eye background image, determining an offset amount for the left eye icons in the corresponding right eye background for the user icons to appear in a z depth plane;
   d. performing operations in steps "a", "b" and "c" for every user icon on a screen at any given time in a virtual reality experience;
   e. after all user icons are arranged for both left and right eyes, switching said compositing software to 2.5D mode for use with the 3D viewport and importing and placing user icons on cards in 3D space;
   f. setting up a ground plane by applying a Constant node with an RGB value of 0,0,0 (black) with an alpha channel of 1 to a card so that only shadows on the ground plane are visible;
   g. placing each card at 0,0,0 XYZ to respectively translate X and Y ground plane and z depth plane with a setting of −90 to receive cast shadows from the user icons;
   h. placing a directional light above each icon cards so that 'Receive Shadow and Cast Shadow' must be enabled on all icon cards and lights in each scene thereby causing cast shadows from the icon cards to fall onto the ground plane;
   i. just before the cast shadows are combined with the icon images, the cast shadows require a similar offset procedure to put them into a correct z depth plane by using a stereo displace tool with a selected value; and
   j. after the icon and cast shadow processes are complete, the two sets of images are combined and output to a Unity software for final placement within a software application.

3. The method in accordance with claim 2, further comprising: in step "i" the selected value is 50.

\* \* \* \* \*